United States Patent
Jung et al.

(10) Patent No.: US 10,396,930 B2
(45) Date of Patent: Aug. 27, 2019

(54) NOMA SCHEME DATA RECEIVING METHOD AND USER EQUIPMENT

(71) Applicant: LG ELECTRONICS INC., Seoul (KR)

(72) Inventors: Manyoung Jung, Seoul (KR); Bonghoe Kim, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 22 days.

(21) Appl. No.: 15/520,646

(22) PCT Filed: Nov. 3, 2015

(86) PCT No.: PCT/KR2015/011677
§ 371 (c)(1),
(2) Date: Apr. 20, 2017

(87) PCT Pub. No.: WO2016/072687
PCT Pub. Date: May 12, 2016

(65) Prior Publication Data
US 2017/0310417 A1    Oct. 26, 2017

Related U.S. Application Data

(60) Provisional application No. 62/074,658, filed on Nov. 4, 2014.

(51) Int. Cl.
*H04B 7/216* (2006.01)
*H04J 99/00* (2009.01)
(Continued)

(52) U.S. Cl.
CPC ............ *H04J 15/00* (2013.01); *H04J 11/004* (2013.01); *H04L 1/18* (2013.01); *H04L 1/1861* (2013.01);
(Continued)

(58) Field of Classification Search
CPC ... H04L 5/0023; H04L 5/0048; H04L 5/0053; H04W 72/0453; H04W 24/00;
(Continued)

(56) References Cited

U.S. PATENT DOCUMENTS

2008/0019434 A1*  1/2008  Kim ................... H04B 1/71072
                                                    375/232
2013/0196700 A1*  8/2013  Tiirola ................ H04J 11/004
                                                    455/501
(Continued)

FOREIGN PATENT DOCUMENTS

JP    2014-131202 A    7/2014
JP    2014-154962 A    8/2014

*Primary Examiner* — Un C Cho
*Assistant Examiner* — Atique Ahmed
(74) *Attorney, Agent, or Firm* — Birch, Stewart, Kolasch & Birch, LLP

(57) ABSTRACT

A non-orthogonal multiple access (NOMA) scheme data receiving method is provided. The method can comprise the steps of: receiving, by a user equipment (UE), downlink control information (DCI) for a NOMA scheme; receiving downlink data on the basis of the DCI; decoding interference data included in the received downlink data; cancelling decoded interference data in the received downlink data if the decoding is successful; and decoding the own downlink data remaining after the interference data has been cancelled.

16 Claims, 15 Drawing Sheets

(51) Int. Cl.
  *H04L 1/18* (2006.01)
  *H04W 72/04* (2009.01)
  *H04J 11/00* (2006.01)

(52) U.S. Cl.
  CPC ......... *H04W 72/042* (2013.01); *H04L 1/1812* (2013.01)

(58) Field of Classification Search
  CPC ................. H04B 1/707; H04B 7/2628; H04B 2201/70702; H04J 13/00; H04J 13/18
  See application file for complete search history.

(56) References Cited

U.S. PATENT DOCUMENTS

| | | |
|---|---|---|
| 2013/0252624 A1 | 9/2013 | Pajukoski et al. |
| 2014/0044091 A1 | 2/2014 | Kishiyama |
| 2014/0314006 A1 | 10/2014 | Suh et al. |
| 2015/0222304 A1* | 8/2015 | Xu ........................ H04B 1/0475 370/329 |
| 2015/0312074 A1* | 10/2015 | Zhu ..................... H04L 27/2627 370/329 |
| 2015/0327095 A1* | 11/2015 | Kwak .................. H04B 7/0621 370/252 |
| 2015/0372777 A1* | 12/2015 | Sano ....................... H04J 11/004 370/329 |
| 2015/0382327 A1* | 12/2015 | Kishiyama ............. H04J 11/004 370/329 |
| 2016/0037460 A1* | 2/2016 | Benjebbour .......... H04L 1/0003 370/329 |
| 2016/0066345 A1* | 3/2016 | Sun ..................... H04W 74/006 370/329 |
| 2016/0094996 A1* | 3/2016 | Xiong .................... H04W 4/70 370/329 |
| 2016/0330695 A1* | 11/2016 | Benjebbour ........ H04W 52/262 |

\* cited by examiner

Non-orthogonal assisted
by power control

NOMA SCHEME DATA RECEIVING METHOD AND USER EQUIPMENT

CROSS REFERENCE TO RELATED APPLICATIONS

This application is the National Phase of PCT International Application No. PCT/KR2015/011677, filed on Nov. 3, 2015, which claims priority under 35 U.S.C. 119(e) to U.S. Provisional Application No. 62/074,658, filed on Nov. 4, 2014, all of which are hereby expressly incorporated by reference into the present application.

BACKGROUND OF THE INVENTION

Field of the Invention

The present invention relates to mobile communication.

Related Art

3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink.

Such LTE may be divided into a frequency division duplex (FDD) type and a time division duplex (TDD) type.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

Nowadays, as candidate technology of a next generation wireless communication system, for example a 5th generation mobile communication system, Non-Orthogonal Multiple Access (NOMA) has been discussed.

NOMA is a multiple access method of multiplexing and transmitting data of many users in the same resource. Specifically, NOMA is a multiple access technique that can obtain large bandwidth efficiency by allocating a plurality of UEs to the same frequency-time resource with an additionally previously considered power rate and by reducing interference between user equipments through an interference cancellation receiver, compared with a method of allocating a resource in a frequency-time domain in an existing OFDMA system based on interference cancellation based reception, and is discussed as important candidate technology of a future 5G system.

However, in order for a receiver of a NOMA scheme to perform interference cancellation, a detailed operation and information in which a base station should transmit has never been previously technically suggested.

SUMMARY OF THE INVENTION

Accordingly, a disclosure of the present specification has been made in an effort to solve the aforementioned problem.

In an aspect, a method of receiving data with a Non-Orthogonal Multiple Access (NOMA) scheme is provided. The method includes: receiving, by a user equipment (UE), downlink control information (DCI) for a NOMA scheme; receiving downlink data based on the DCI; decoding interference data included in the received downlink data; cancelling the decoded interference data from the received downlink data, when the decoding is succeeded; and decoding the remaining downlink data after the interference data have been cancelled.

The method may further include transmitting uplink control information (UCI) including hybrid automatic repeat request (HARQ) ACK/NACK of the interference data and HARQ ACK/NACK of the downlink data, when decoding of the downlink data is succeeded.

The DCI may include downlink resource allocation information for receiving the downlink data and information about HARQ ACK/NACK on whether an interference UE, which is an owner of the interference data has previously performed successful reception.

The method may further include: flushing a HARQ buffer for interference data, if an interference UE, which is an owner of the interference data has previously performed successful reception based on the DCI; and storing the decoded interference data within a HARQ buffer for the interference data.

The method may further include determining, by the user equipment, whether the interference data were previously successfully received, because the interference data have been retransmitted, if an interference UE, which is an owner of the interference data has not previously performed successful reception based on the DCI. The decoding of interference data may be performed even when an interference UE, which is an owner of the interference data has not previously performed successful reception and even when the user equipment has not previously successfully received the interference data.

The method may further include: determining, by the user equipment, whether the interference data were previously successfully received, because the interference data have been retransmitted, if an interference UE, which is an owner of the interference data has not previously performed successful reception based on the DCI; generating a hard bit using the previously successfully received interference data, when an interference UE, which is an owner of the interference data has not previously performed successful reception, but when the user equipment has previously successfully received the interference data; and cancelling the interference data included in the received downlink data based on the generated hard bit.

In another aspect, a user equipment that performs data reception of a Non-Orthogonal Multiple Access (NOMA) scheme is provided. The user equipment includes: a radio frequency (RF) unit; and a processor that controls the RF unit. The processor receives downlink control information (DCI) for a NOMA scheme, receives downlink data based on the DCI, decodes interference data included in the received downlink data, cancels the decoded interference data from the received downlink data, when the decoding is succeeded, and decodes the remaining downlink data after the interference data have been cancelled.

Advantageous Effects

According to disclosure of this specification, in a next generation communication system, a NOMA scheme can be used.

DESCRIPTION OF EXEMPLARY EMBODIMENTS

Figure 1:
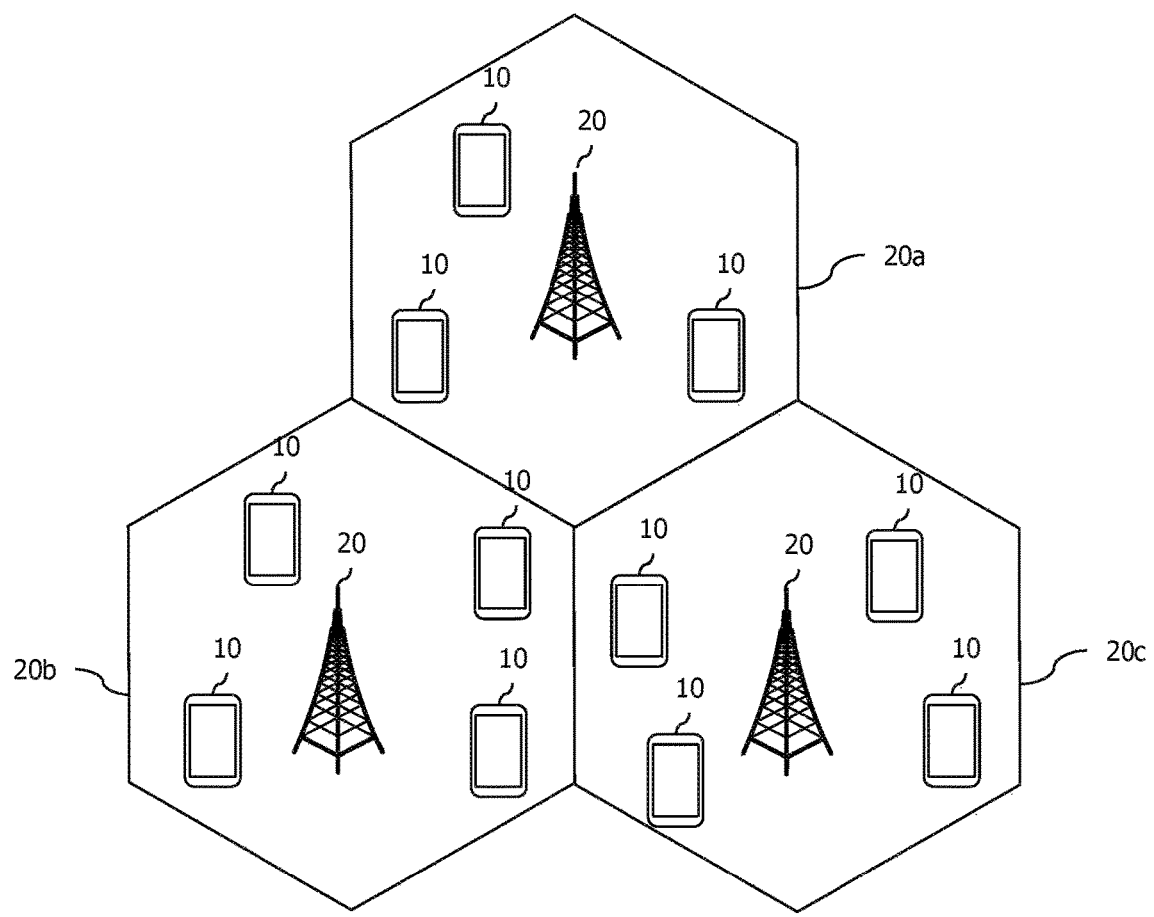
FIG. 1 illustrates a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, user equipment (UE) may be stationary or mobile, and may be denoted by other terms such as device, wireless device, terminal, MS (mobile station), UT (user terminal), SS (subscriber station), MT (mobile terminal) and etc.

FIG. 1 Illustrates a Wireless Communication System.

Referring to FIG. 1, the wireless communication system includes at least one base station (BS) 20. Respective BSs 20 provide a communication service to particular geographical areas 20a, 20b, and 20c (which are generally called cells).

The UE generally belongs to one cell and the cell to which the terminal belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the terminal 10 and an uplink means communication from the terminal 10 to the base station 20. In the downlink, a transmitter may be a part of the base station 20 and a receiver may be a part of the terminal 10. In the uplink, the transmitter may be a part of the terminal 10 and the receiver may be a part of the base station 20.

Hereinafter, the LTE system will be described in detail.

Figure 2:
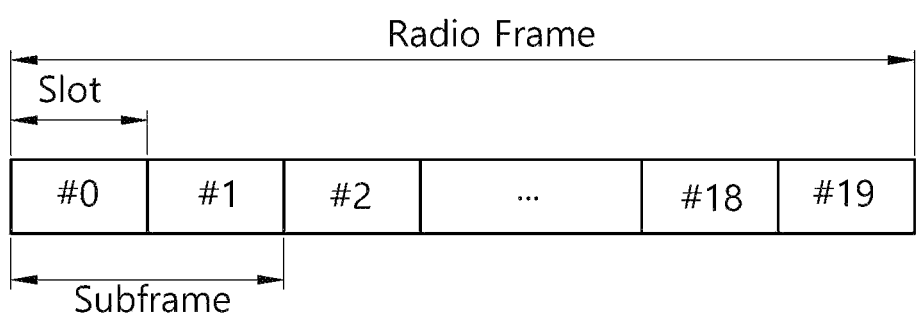
FIG. 2 illustrates the architecture of a radio frame according to frequency division duplex (FDD) of 3rd generation partnership project (3GPP) long term evolution (LTE).

FIG. 2 Shows a Downlink Radio Frame Structure According to FDD of 3rd Generation Partnership Project (3GPP) Long Term Evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

Referring to FIG. 2, the radio frame consists of 10 subframes. One subframe consists of two slots. Slots included in the radio frame are numbered with slot numbers 0 to 19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The structure of the radio frame is for exemplary purposes only, and thus the number of subframes included in the radio frame or the number of slots included in the subframe may change variously.

Meanwhile, one slot may include a plurality of OFDM symbols. The number of OFDM symbols included in one slot may vary depending on a cyclic prefix (CP).

Figure 3:
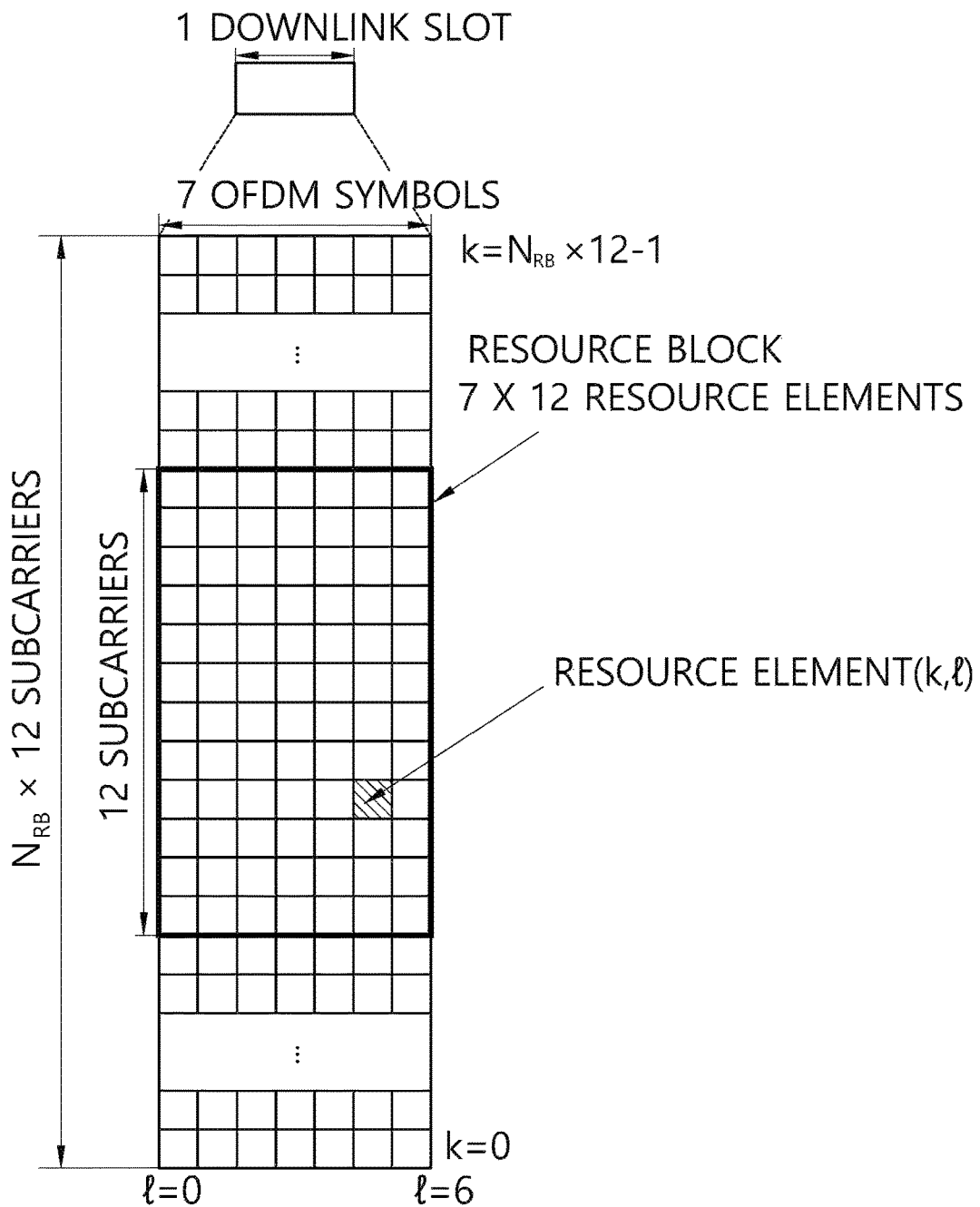
FIG. 3 illustrates an example resource grid for one uplink or downlink slot in 3GPP LTE.

FIG. 3 Illustrates an Example Resource Grid for One Uplink or Downlink Slot in 3GPP LTE.

Referring to FIG. 3, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

Resource block (RB) is a resource allocation unit and includes a plurality of sub-carriers in one slot. For example, if one slot includes seven OFDM symbols in the time domain and the resource block includes 12 sub-carriers in the frequency domain, one resource block may include 7×12 resource elements (REs).

Meanwhile, the number of sub-carriers in one OFDM symbol may be one of 128, 256, 512, 1024, 1536, and 2048.

Figure 4:
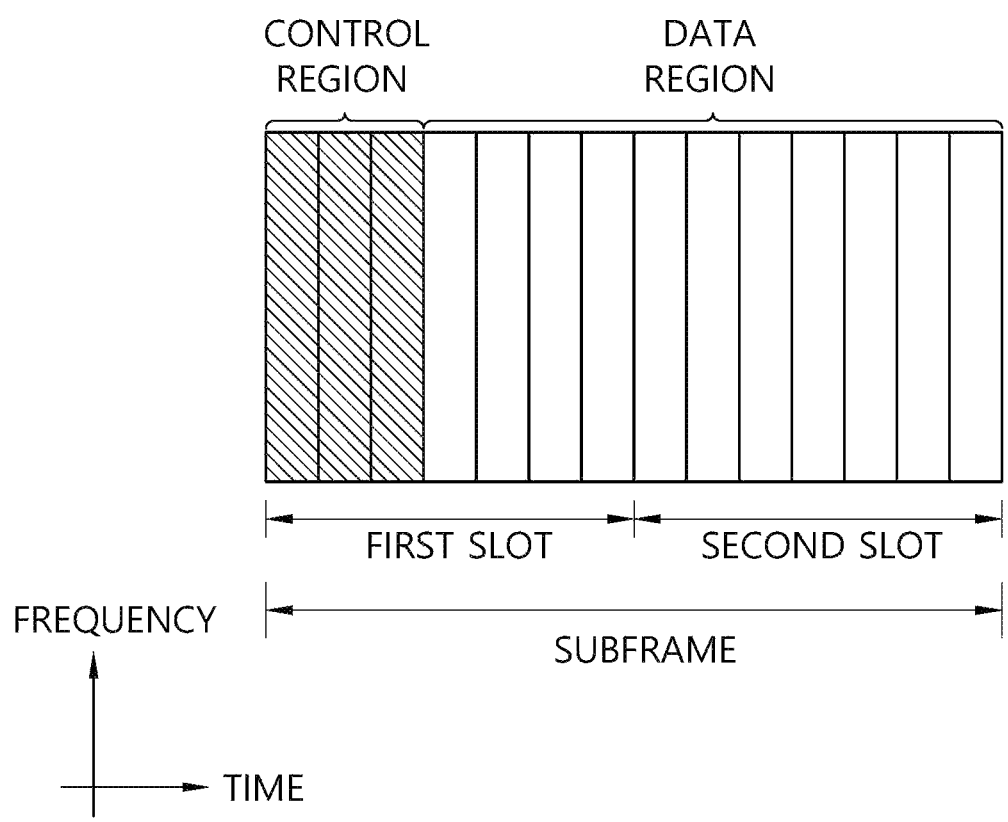
FIG. 4 illustrates the architecture of a downlink subframe.

In 3GPP LTE, the resource grid for one uplink slot shown in FIG. 4 may also apply to the resource grid for the downlink slot.

FIG. 4 Illustrates the Architecture of a Downlink Sub-Frame.

In FIG. 4, assuming the normal CP, one slot includes seven OFDM symbols, by way of example.

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are allocated to the control region, and a PDSCH is allocated to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding. The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an upper layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

The uplink channels include a PUSCH, a PUCCH, an SRS (Sounding Reference Signal), and a PRACH (physical random access channel).

Figure 5:
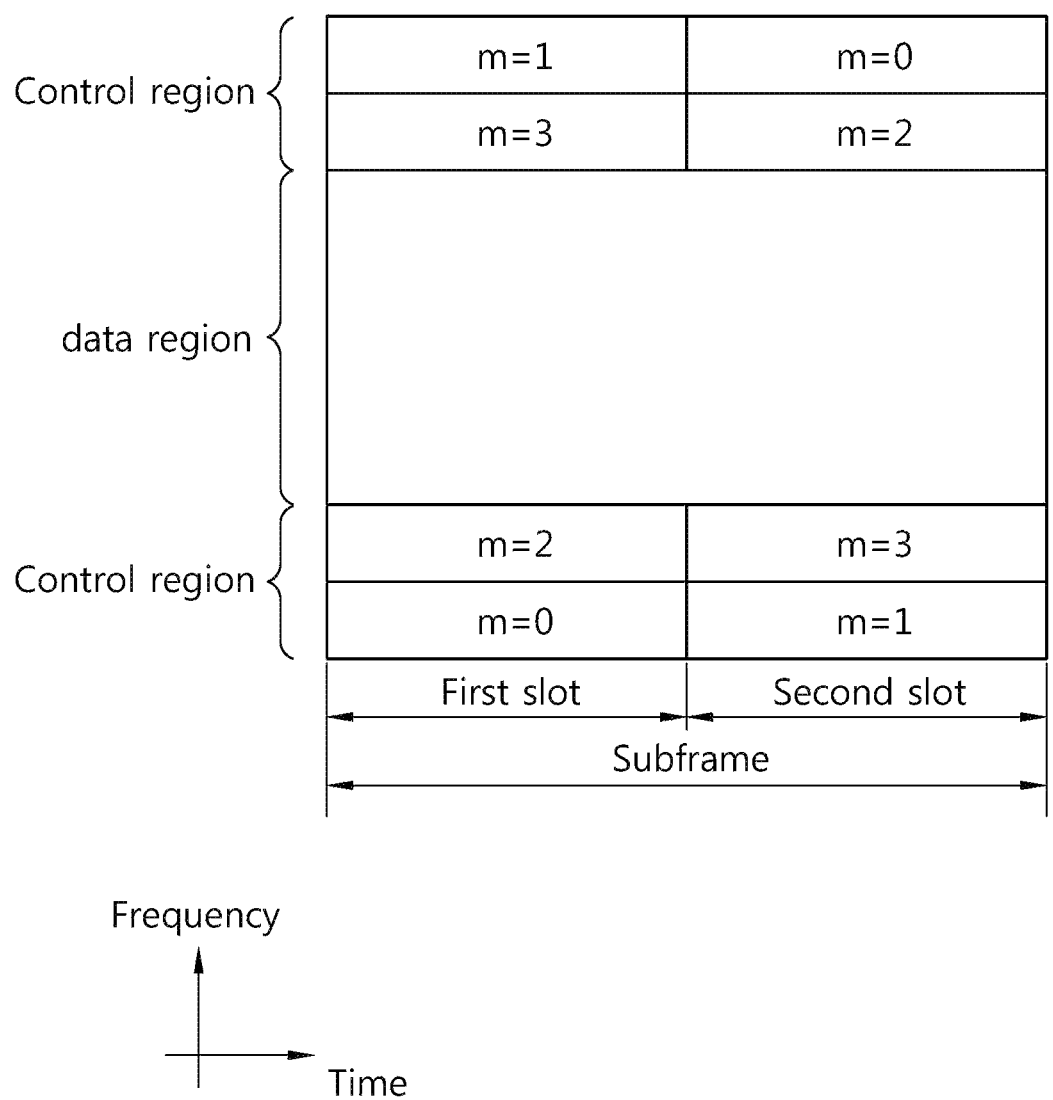
FIG. 5 illustrates the architecture of an uplink subframe in 3GPP LTE.

FIG. 5 Illustrates the Architecture of an Uplink Sub-Frame in 3GPP LTE.

Referring to FIG. 5, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

<Carrier Aggregation: CA>

Hereinafter, a carrier aggregation system will be described.

The carrier aggregation (CA) system means aggregating multiple component carriers (CCs). By the carrier aggregation, the existing meaning of the cell is changed. According to the carrier aggregation, the cell may mean a combination of a downlink component carrier and an uplink component carrier or a single downlink component carrier.

Further, in the carrier aggregation, the cell may be divided into a primary cell, secondary cell, and a serving cell. The primary cell means a cell that operates at a primary frequency and means a cell in which the UE performs an initial connection establishment procedure or a connection reestablishment procedure with the base station or a cell indicated by the primary cell during a handover procedure. The secondary cell means a cell that operates at a secondary frequency and once an RRC connection is established, the secondary cell is configured and is used to provide an additional radio resource.

The carrier aggregation system may be divided into a continuous carrier aggregation system in which aggregated carriers are contiguous and a non-contiguous carrier aggregation system in which the aggregated carriers are separated from each other. Hereinafter, when the contiguous and non-contiguous carrier systems are just called the carrier aggregation system, it should be construed that the carrier aggregation system includes both a case in which the component carriers are contiguous and a case in which the component carriers are non-contiguous. The number of component carriers aggregated between the downlink and the uplink may be differently set. A case in which the number of downlink CCs and the number of uplink CCs are the same as each other is referred to as symmetric aggregation and a case in which the number of downlink CCs and the number of uplink CCs are different from each other is referred to as asymmetric aggregation.

When one or more component carriers are aggregated, the component carriers to be aggregated may just use a bandwidth in the existing system for backward compatibility with the existing system. For example, in a 3GPP LTE system, bandwidths of 1.4 MHz, 3 MHz, 5 MHz, 10 MHz, 15 MHz, and 20 MHz are supported and in a 3GPP LTE-A system, a wideband of 20 MHz or more may be configured by using only the bandwidths of the 3GPP LTE system. Alternatively, the wideband may be configured by not using the bandwidth of the existing system but defining a new bandwidth.

Meanwhile, in order to transmit/receive packet data through a specific secondary cell in the carrier aggregation, the UE first needs to complete configuration for the specific secondary cell. Herein, the configuration means a state in which receiving system information required for data transmission/reception for the corresponding cell is completed. For example, the configuration may include all processes that receive common physical layer parameters required for the data transmission/reception, media access control (MAC) layer parameters, or parameters required for a specific operation in an RRC layer. When the configuration-completed cell receives only information indicating that the packet data may be transmitted, the configuration-completed cell may immediately transmit/receive the packet.

The configuration-completed cell may be present in an activation or deactivation state. Herein, the activation transmitting or receiving the data or a ready state for transmitting or receiving the data. The UE may monitor or receive the control channel (PDCCH) and the data channel (PDSCH) of the activated cell in order to verify resources (a frequency, a time, and the like) assigned thereto.

The deactivation represents that transmitting or receiving traffic data is impossible or measurement or transmitting/receiving minimum information is possible. The UE may receive system information SI required for receiving the packet from the deactivated cell. On the contrary, the UE does not monitor or receive the control channel (PDCCH) and the data channel (PDSCH) of the deactivated cell in order to verify the resources (the frequency, the time, and the like) assigned thereto.

Figure 6:
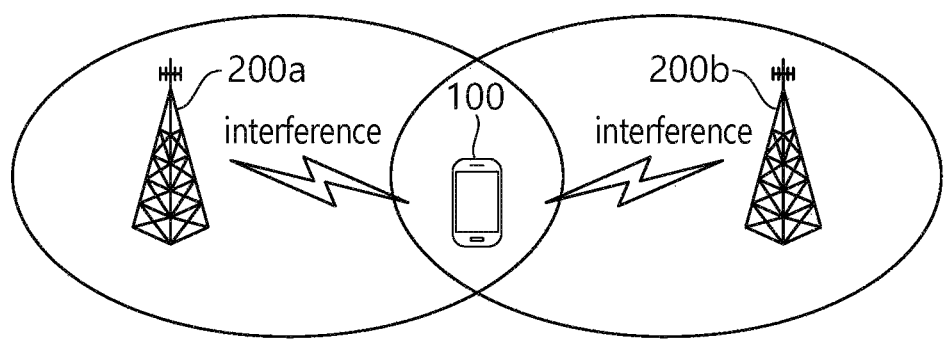
FIG. 6 illustrates inter-cell interference.

FIG. 6 Illustrates Inter-Cell Interference.

As illustrated in FIG. 6, when a UE 100 is located in an overlapping area of the coverage of a first cell 200a and the coverage of a second cell 200b, a signal of the first cell 200a acts as an interference with a second signal of the second cell 200b, while a signal of the second cell 200b acts as interference with a signal of the first cell 200a.

A basic method for addressing such an interference problem is using different frequencies for cells. However, since a frequency is a scarce and expensive resource, wireless service providers do not prefer a frequency division method.

<Introduction of Small Cell>

It is expected that small cells with small cell coverage are added to the coverage of an existing cell in a next-generation mobile communication system and deal with greater traffic. The existing cell has relatively larger coverage than the small cells and thus is referred to as a macrocell, which is described with reference to FIG. 8.

Figure 7:
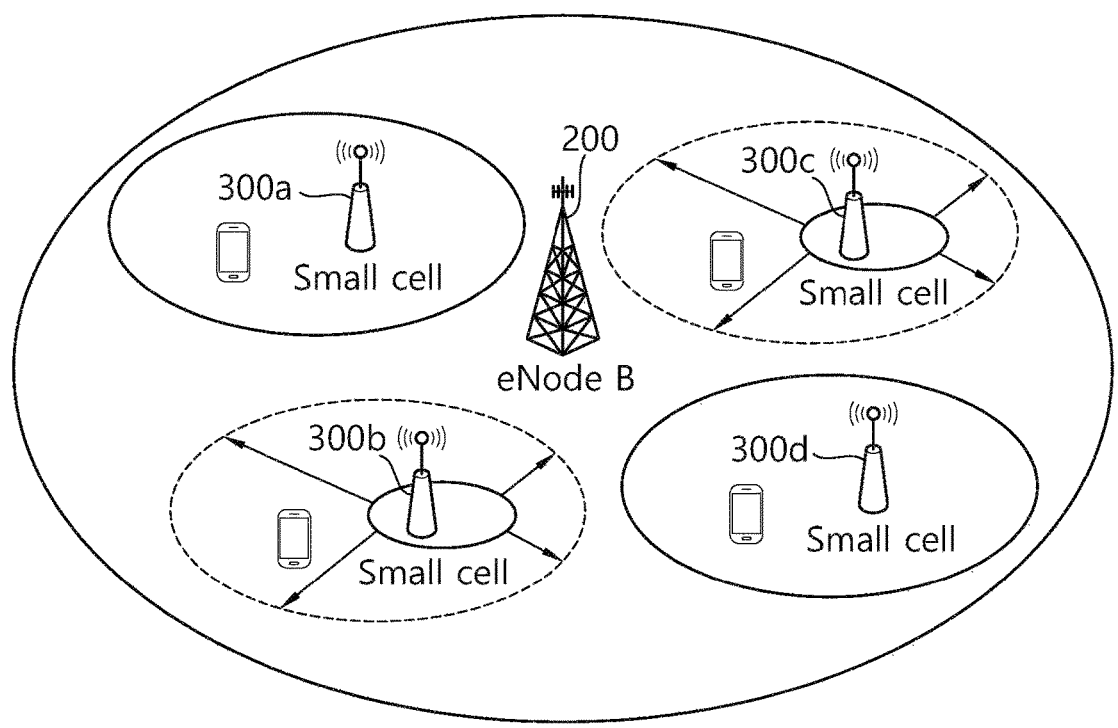
FIG. 7 illustrates an environment of a heterogeneous network including a macrocell and small cells as a potential next-generation wireless communication system.

FIG. 7 Illustrates an Environment of a Heterogeneous Network Including a Macrocell and Small Cells as a Potential Next-Generation Wireless Communication System.

FIG. 7 shows a heterogeneous network environment in which a macrocell based on an existing BS 200 overlaps with small cells based on one or more small BSs 300a, 300b, 300c, and 300d. The existing BS provides relatively larger coverage than the small BSs and thus is also referred to as a macro BS (macro eNodeB: MeNB). In the present specification, a macrocell may be replaceable with a macro BS. A UE connected to the macrocell 200 may be referred to as a macro UE. The macro UE receives a downlink signal from the macro BS and transmits an uplink signal to the macro BS.

In this heterogeneous network, the macrocell is set as a primary cell (Pcell) and the small cells are set as secondary cells (Scell), thereby filling a gap in the macrocell coverage. Further, the small cells are set as primary cells (Pcell) and the macrocell is set as a secondary cell (Scell), thereby boosting overall performance.

The introduction of small cells, however, may aggravate inter-cell interference.

<Interference Cancellation>

As described above, there may be a method of solving an inter-cell interference problem through an eICIC technique and a method in which a UE 100 performs reception through Interference Cancellation (hereinafter, referred to as "IC").

In order for the UE to efficiently cancel an interference signal from a neighboring cell, the serving cell may transmit interference cancellation assistance information to the UE.

As described above, reception to be performed through Network Assisted Interference Cancellation and Suppression (NAICS) is referred to as Further Enhanced Inter-Cell Interference Coordination (FeICIC).

In this way, when an interference signal from the neighboring cell is cancelled, an SINR of a signal from the serving cell is more improved and thus a performance gain can be obtained.

A signal or a channel to be a target of interference cancellation may be a Cell-specific Reference Signal (CRS), a Physical Broadcasting Channel (PBCH), a Sync Channel (SCH), and a Physical downlink shared channel (PDSCH).

Figure 8:
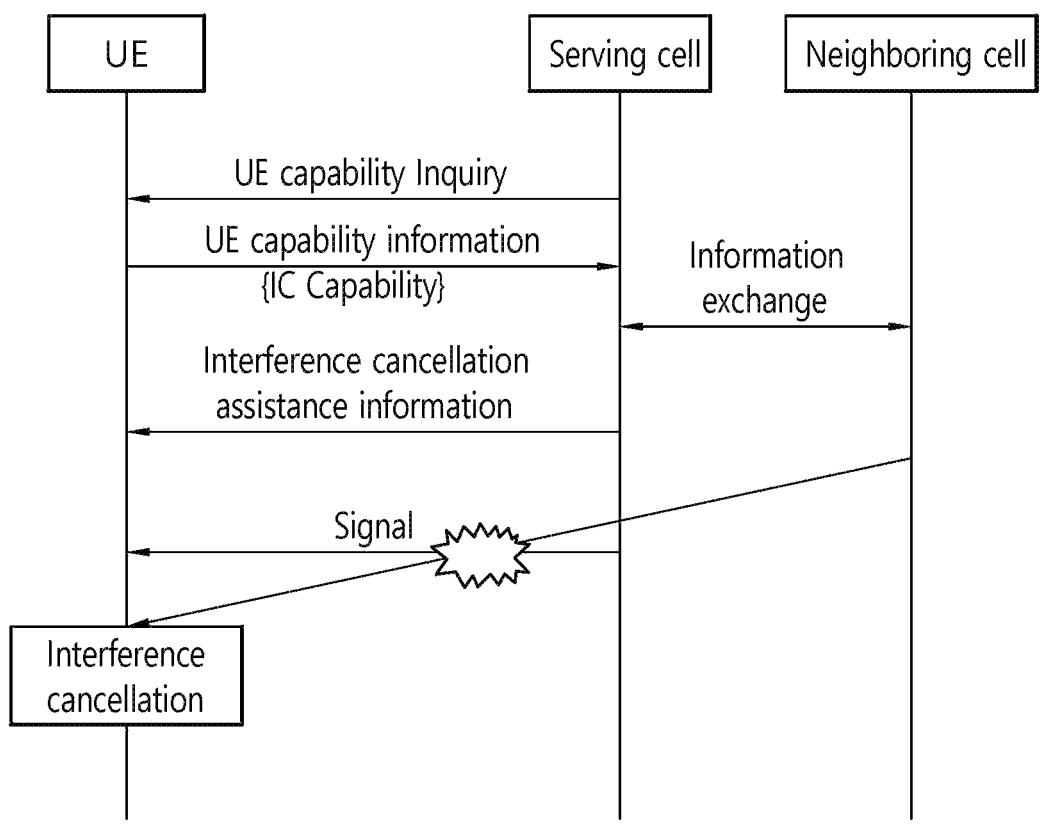
FIG. 8 is a signal flowchart illustrating a receiving method using interference cancellation.

FIG. 8 is a Signal Flowchart Illustrating a Receiving Method Using Interference Cancellation.

A serving cell requests an UE capability inquiry to the UE 100 according to necessity or according to an instruction by a superordinate layer.

Accordingly, the UE 100 provides UE capability information to the serving cell according to the request. That is, the UE 100a notifies a serving cell through UE capability information that an eICIC function and an interference cancellation (IC) capability exist in response to an UE capability inquiry. Alternatively, when a radio access performance of the UE 100 is changed, a superordinate layer of the UE 100 may instruct a request for a capability inquiry to the superordinate layer of the serving cell.

The serving cell may determine whether a neighboring cell is an aggressor cell causing interference through information exchange with the neighboring cell. If a neighboring cell is an aggressor cell causing interference, the serving cell acquires information about a random channel of the neighboring cell.

Thereafter, when a signal to transmit to the UE 100 exists, the serving cell transmits interference cancellation assistance information including the acquired information about a random channel to the UE 100.

Thereafter, the serving cell transmits a signal to the UE 100.

In this case, when the signal transmitted by the serving cell is interfered by a signal transmitted by the neighboring cell, the UE 100 performs interference cancellation.

<Introduction of Non-Orthogonal Multiple Access (NOMA) in Next Generation Wireless Communication System>

Nowadays, as candidate technology of a next generation wireless communication system, for example a 5th generation mobile communication system, Non-Orthogonal Multiple Access (NOMA) is discussed.

NOMA is a multiple access method of multiplexing and transmitting data of many users in the same resource. Specifically, NOMA is a multiple access technique that can obtain large bandwidth efficiency by allocating a plurality of UEs to the same frequency-time resource with an additionally previously considered power rate and by reducing interference between user equipments through an interference cancellation receiver, compared with a method of allocating a resource in a frequency-time domain in an existing OFDMA system based on interference cancellation based reception, and is discussed as important candidate technology of a future 5G system.

Figure 9A:
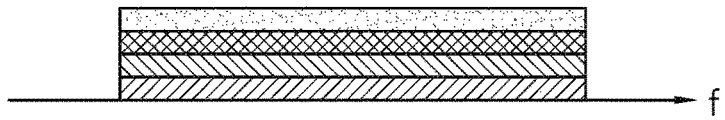
FIG. 9A illustrates a W-CDMA method.
Figure 9B:
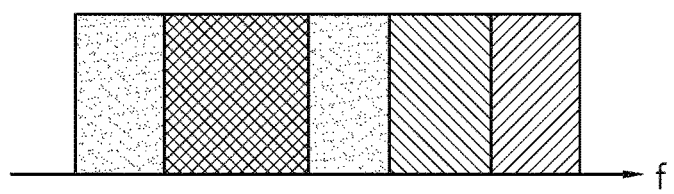
FIG. 9B illustrates an OFDMA method.
Figure 9C:
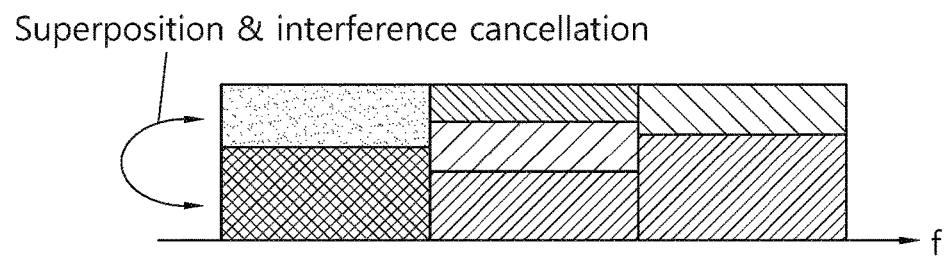
FIG. 9C illustrates a NOMA scheme.

FIG. 9A Illustrates a W-CDMA Method, FIG. 9B Illustrates an OFDMA Method, and FIG. 9C Illustrates a NOMA Scheme.

As can be seen with reference to FIG. 9A, in a multiple access method of a W-CDMA method, when multiplexing data of many users, by acquiring orthogonality by using an orthogonal code or a quasi-orthogonal code, an influence of interference between data is reduced. In a multiple access method of an OFDMA method of FIG. 9B, when multiplexing data of many users, by acquiring orthogonality by disposing data in different frequency bands, an influence of interference is reduced. However, in a multiple access method of a NOMA scheme of FIG. 9C, by transmitting data of other users in other frequency bands, as in an OFDMA method and by transmitting data of other users even in the same frequency band, transmitting efficiency is increased. In this case, it is assumed that the receiver may cancel an interference signal of other user data allocated to the same frequency band.

Figure 10:
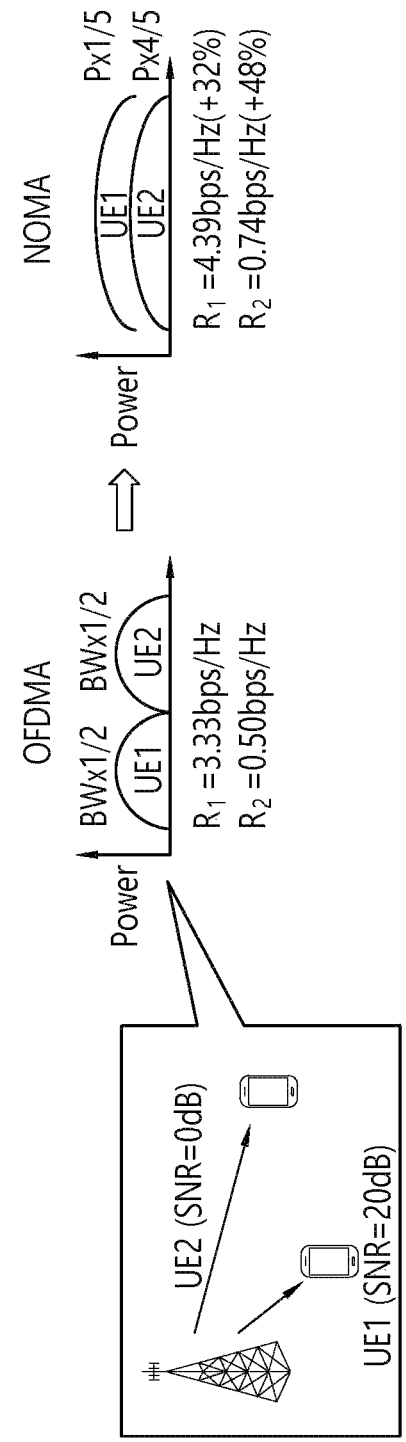
FIG. 10 is a diagram comparing an OFDMA method and a NOMA scheme.

FIG. 10 is a Diagram Comparing an OFDMA Method and a NOMA Scheme.

In FIG. 10, the number of users who perform data transmission in the same frequency resource is assumed to 2. However, an illustration of FIG. 10 is for convenience of description, and the number of users who transmit data to the same frequency resource is not limited.

When it is assumed that in a transmitting stage, UE1 and UE2 are selected and the UE1 and the UE2 transmit data to a specific frequency resource, a transmitting signal is as follows.

Equation 1

$$x = \sqrt{P_1}x_1 + \sqrt{P_2}x_2 \quad \text{[Equation 1]}$$

In Equation 1, $P_i$ is transmission power of UEi, and $x_i$ represents data of UEi. In this case, in the UEi, a receiving signal is as follows.

Equation 2

$$y_i = h_i x + w_i \quad \text{[Equation 2]}$$

In Equation 2, $h_i$ is a parameter representing a fading channel and is Additive White Gaussian Noise (AWGN) whose average is 0 and whose distribution is $\sigma_h^2$, and $w_i$ is AWGN whose average is 0 and whose distribution is $N_{0,i}$.

In this case, when it is assumed that a channel gain of UEi is $$\frac{|h_i|^2}{N_{0,i}},$$

a channel gain of the UEi is aligned in ascending order. In this case, when a channel gain of the UE1 is larger than that of the UE2, as in $$\frac{|h_1|^2}{N_{0,1}} > \frac{|h_2|^2}{N_{0,2}},$$

a receiver of the UE1 first decodes data of the UE2, regenerates an interference signal using a decoding result of UE2, and subtracts the interference signal from a receiving signal of UE1. Therefore, the receiver of the UE1 may decode data of the UE1 from a signal in which an interference signal of the UE2 is cancelled. When selecting a receiver of such an interference cancellation method, it is important to decode the interference signal without an error and thus it is preferable to allocate much power to data of the UE2. In such a decoding method, a performance in which the UE may obtain is as follows.

Equation 3

$$R_1 = \log_2\left(1 + \frac{P_1|h_1|^2}{N_{0,1}}\right),$$ [Equation 3]

$$R_2 = \log_2\left(1 + \frac{P_2|h_2|^2}{P_1|h_1|^2 + N_{0,2}}\right)$$

In Equation 3, Ri represents a performance of UEi. In order to compare with an existing OFDMA multiple access method, when a system band larger by a ∈ [0, 1] times than an entire system band is allocated to the UE1 and when a system band larger by (1−a) times than an entire system band is allocated to the UE2, a performance of each UE is as follows.

Equation 4

$$R_1 = a\log_2\left(1 + \frac{P_1|h_1|^2}{aN_{0,1}}\right),$$ [Equation 4]

$$R_2 = (1-a)\log_2\left(1 + \frac{P_2|h_2|^2}{(1-a)N_{0,2}}\right)$$

In Equation 4, when it is assumed that $P_1$=P/5 and $P_2$=4P/5 (P: entire transmission power), it may be obtained that $R_1$=4.39 bps/Hz and that $R_2$=0.74 bps/Hz, in Equation 4, when it is assumed that $P_1$=$P_2$=P/2 and that a=0.5, it may be obtained that $R_1$=3.33 bps/Hz and that $R_2$=0.50 bps/Hz. Therefore, the sum of performances of NOMA has a larger value and thus it may be determined that transmitting efficiency increases.

However, in order for a receiver of a NOMA scheme to perform interference cancellation, information and a detailed operation in which the network should notify has never been previously technically suggested.

<Disclosure of this Specification>

Therefore, disclosure of this specification suggests information and a detailed operation in which a network should notify in order for a receiver of a NOMA scheme to perform interference cancellation.

Figure 11:
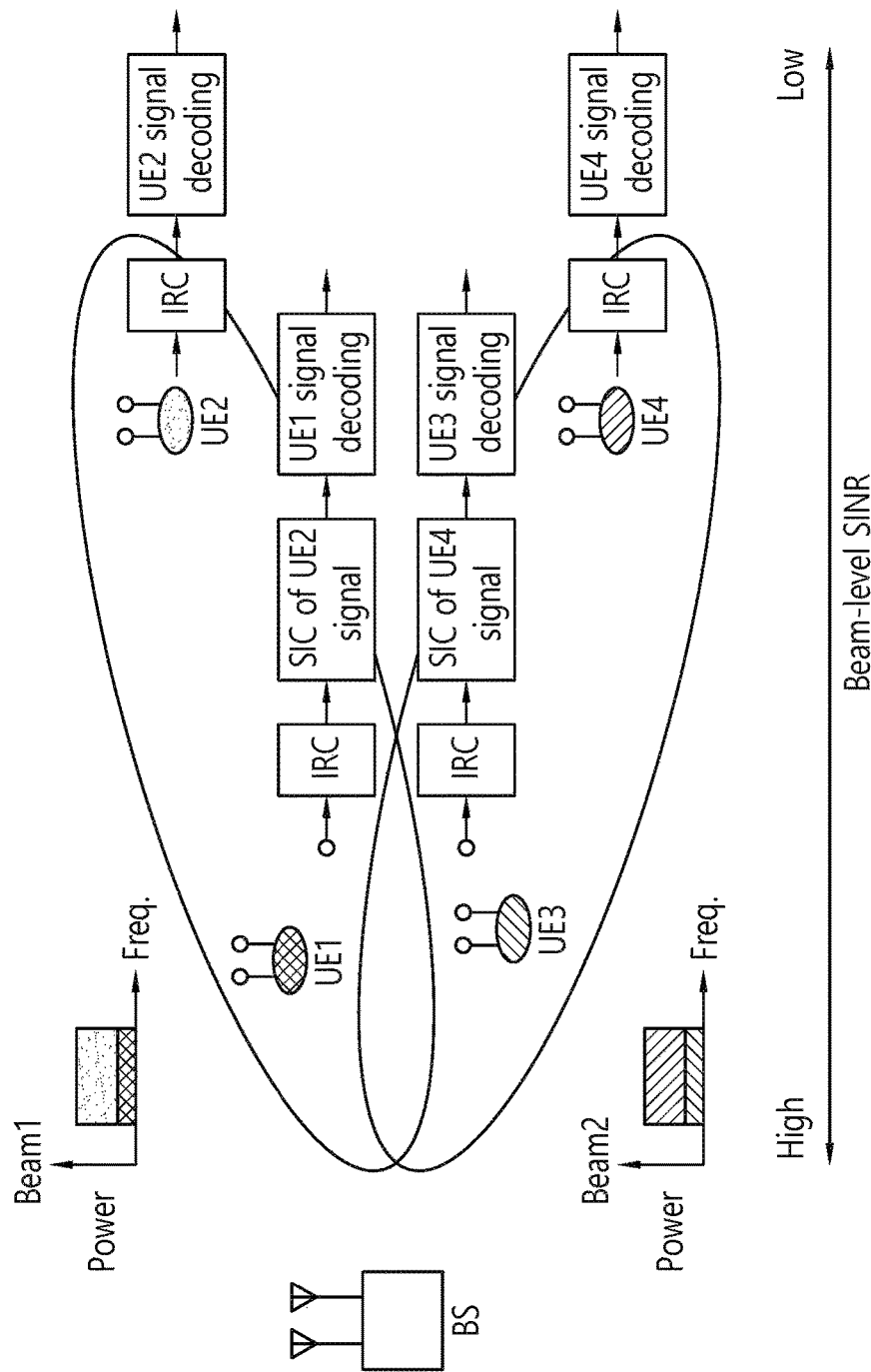
FIG. 11 is a diagram illustrating a concept of an interference cancellation technique in a NOMA scheme.

FIG. 11 is a Diagram Illustrating a Concept of an Interference Cancellation Technique in a NOMA Scheme.

Referring to FIG. 11, in a NOMA scheme, a base station (BS) pairs a UE1 and a UE2 for beamforming, transmits a signal to the UE1 and the UE2 on the same frequency, and increases transmission power of the UE2. Similarly, the BS pairs a UE3 and a UE4 for beamforming, transmits a signal to the UE3 and the UE4 on the same frequency, and increases transmission power of the UE4.

In this case, a signal of the UE2 is mixed as interference within a signal in which the UE1 receives from the BS. Therefore, the UE1 decodes an interference signal of the UE2 and cancels the decoded interference signal of the UE2 from the signal in which the UE1 receives, thereby obtaining a signal therefor.

In such a NOMA scheme, major element technology may be divided into a resource allocation technique of the BS and an interference cancellation technique of the UE. Here, the interference cancellation technique of the UE may have the following form.

(a) Symbol-Level Interference Cancellation Technique

Maximum likelihood (ML)

Symbol-level Interference Cancellation (SIC) technique (b) Codeword Level Interference Cancellation (CWIC) Technique MMSE based Linear CWIC (L-CWIC)

ML-CWIC

In a given environment, a receiving gain is changed according to each interference cancellation technique, and in a case to which an ML technique is applied and a case to which a CWIC technique is applied in proportional to implementation complexity of the UE, a gain generally increases.

Accordingly, in this specification, in consideration of implementation complexity and power consumption according to the implementation complexity, and an UE receiving gain, by enabling the BS to previously know a technique in which the UE may use for NOMA, efficiency of an entire system can increase.

This specification suggests the following major characteristics.

(a) UE capability information related to an interference cancellation receiving structure (b) Downlink Control Information (DCI) for NOMA: referred to as $DCI_{NOMA}$ for convenience of description (c) Uplink Control Information (UCI) for NOMA: referred to as $UCI_{NOMA}$ for convenience of description (d) Operation of the BS and the UE according to $DCI_{NOMA}$ and $UCI_{NOMA}$ (a) to (d) will be described in detail as follows.

When describing (a), the UE signals UE Capability Information related to an interference cancellation receiving structure to the BS. Specifically, the UE includes a field representing whether an interference cancellation technique in which the UE uses is CWIC or a symbol level interference cancellation technique within UE Capability Information to transmit to the BS. Additionally, when it is necessary that the UE reports a more subdivided interference cancellation receiving technique, the field may be further subdivided. According to an interference cancellation receiving technique reported in this way, when a NOMA resource allocation unit (or NOMA scheduler) within the BS allocates a plurality of users to a specific frequency-time resource, the NOMA resource allocation unit (or NOMA scheduler) may perform resource allocation (i.e., scheduling) in consideration of SNR requirements necessary for a reception performance of each user.

Thereafter, $DCI_{NOMA}$ of (b) is described as follows. First, the $DCI_{NOMA}$ may be divided into $DCI_{NOMA\_S}$ in a symbol level interference cancellation receiving technique and $DCI_{NOMA\_S}$ in a CWIC receiving technique. Information in which $DCI_{NOMA\_S}$ and $DCI_{NOMA\_C}$ include will be described in detail as follows.

For convenience of description, a UE that receives data is represented with $UE_S$, a data signal corresponding thereto is represented with $X_S$, and control information for demodulating the data signal is represented with $DCI_S$. Further, an UE allocated to a frequency-time resource such as the $UE_S$ to cause interference is represented with an $UE_I$, a data signal corresponding thereto is represented with $X_I$, and control information for demodulating the data signal is represented with $DCI_I$. Further, information transmitted to the $UE_S$ and in which the interference cancellation receiver of the $UE_S$ requires for cancelling interference $X_I$ of the $UE_I$ is represented with $DCI_{I\text{-}S}$. In this case, $DCI_{I\text{-}S}$ is a subset of the $DCI_I$ and may be differently generated according to an implementation form of an interference cancellation receiver of the $UE_S$. The $DCI_{I\text{-}S}$ may be more subdivided to be divided into $DCI_{I\text{-}S\_S}$ for a symbol-level interference cancellation receiving technique and $DCI_{I\text{-}S\_C}$ for a CWIC receiving technique. The BS may generate the foregoing control information based on UE capability information received from the UE.

Therefore, $DCI_{NOMA\_S}$ may include $DCI_S$ and $DCI_{I\text{-}S\_S}$, and $DCI_{NOMA\_S}$ may include $DCI_S$ and $DCI_{I\text{-}S\_S}$.

In the foregoing description, the $DCI_{I\text{-}S\_S}$ may include a modulation order (MO), a power ratio (p-b) to a reference signal (RS), a Rank Indicator (RI), and a Precoding Matrix Index (PMI) as follows.

$$DCI_{I\text{-}S\_S}=MO+p\text{-}b+RI+PMI$$

Further, $DCI_{I\text{-}S\_C}$ further includes MCS ($MCS_I$) and RNTI ($RNTI_I$) for the $UE_I$ in addition to information included in $DCI_{I\text{-}S\_S}$. Further, when the BS notifies the $UE_S$ of $ACK/NACK_I$ in which the $UE_I$ reported to the BS, the $ACK/NACK_I$ is useful for HARQ buffer management of the $UE_S$ and thus the $DCI_{I\text{-}S\_S}$ may include the $ACK/NACK_I$. Accordingly, the $DCI_{I\text{-}S\_C}$ is configured in the following form.

$$DCI_{I\text{-}S\_C}=RNTI_I+p\text{-}b+RI+PMI+MCS_I+ACK/NACK_I$$

When describing again such $DCI_{I\text{-}S\_C}$, in the above $DCI_{I\text{-}S\_C}$, if the $UE_S$ may know only $RNTI_I$, by demodulating a value of a currently together transmitted $DCI_I$ through $RNTI_I$, and $MCS_I$ may be indirectly obtained. Further, an $ACK/NACK_I$ result performs a kind of New Data Indicator (NDI) function. Additionally, in a NOMA operation, it is advantageous that the $UE_S$ and the $UE_I$ operate with paired for a predetermined period, and in such a case, $RNTI_I$ existing on DCI is maintained for a predetermined period. In this case, the UE previously notifies through signaling (e.g., RRC signaling) of a superordinate layer instead of signaling $RNTI_I$ every time through DCI or transmits only when a corresponding value is True through $ACK/NACK_I$ that performs an ND' function, and the UE may limit increase of a transmitting bit for $DCI_{NOMA}$ with a technique in which the UE regards and stores that a new $UE_I$ is paired when a corresponding value is True.

Finally, $DCI_{NOMA\_S}$ and $DCI_{NOMA\_S}$ are as follows.

$$DCI_{NOMA\_S}=DCI_S+MO+p\text{-}b+RI+PMI$$

$$DCI_{NOMA\_S}=DCI_S+RNTI_I+p\text{-}b+RI+PMI+MCS_I+ACK/NACK_I$$

Further, because $DCI_{NOMA\_S}$ includes only information corresponding to a subset of $DCI_{NOMA\_C}$, a format of $DCI_{NOMA\_S}$ is not newly generated, but $DCI_{NOMA\_S}$ may be together used. Additionally, when the BS previously pairs $UE_S$ using a NOMA scheme and previously signals RNTI, the BS may not transmit the RNTI every time through DCI.

Thereafter, $UCI_{NOMA}$ of (c) is described as follows. The $UCI_{NOMA}$ includes $UCI_S$ of $UE_S$ that transmits data and additional information $UCI_{I\text{-}S}$ generated in the interference cancellation receiver of the $UE_S$. The $UCI_S$ includes $ACK/NACK_S$, which is a decoding result of data $X_S$ in which the $UE_S$ receives from the BS. The $UCI_{I\text{-}S}$ is additional information generated in the interference cancellation receiver and means $ACK/NACK_{I\text{-}S}$, which is a result in which the $UE_S$ decodes data $X_I$ in CWIC and means an amount $G_{Symbol\text{-}IC}$ of a gain obtained through the interference cancellation receiver in the symbol level IC. Accordingly, the $UCI_{NOMA}$ is subdivided into $UCI_{NOMA\_S}$ and $UCI_{NOMA\_S}$ according to used interference cancellation technology as follows.

$$UCI_{NOMA\_S}=UCI_S+G_{Symbol\text{-}IC}$$

$$UCI_{NOMA\_S}=UCI_S+ACK/NACK_{I\text{-}S}$$

As in $DCI_{NOMA}$ when an information amount of $G_{Symbol\text{-}IC}$ corresponds as in $ACK/NACK_{I\text{-}S}$, an UCI format for NOMA may be unified into one.

(d) Operation of the BS and the UE according to $DCI_{NOMA}$ and $UCI_{NOMA}$ will be described with reference to FIG. 12.

Figure 12:
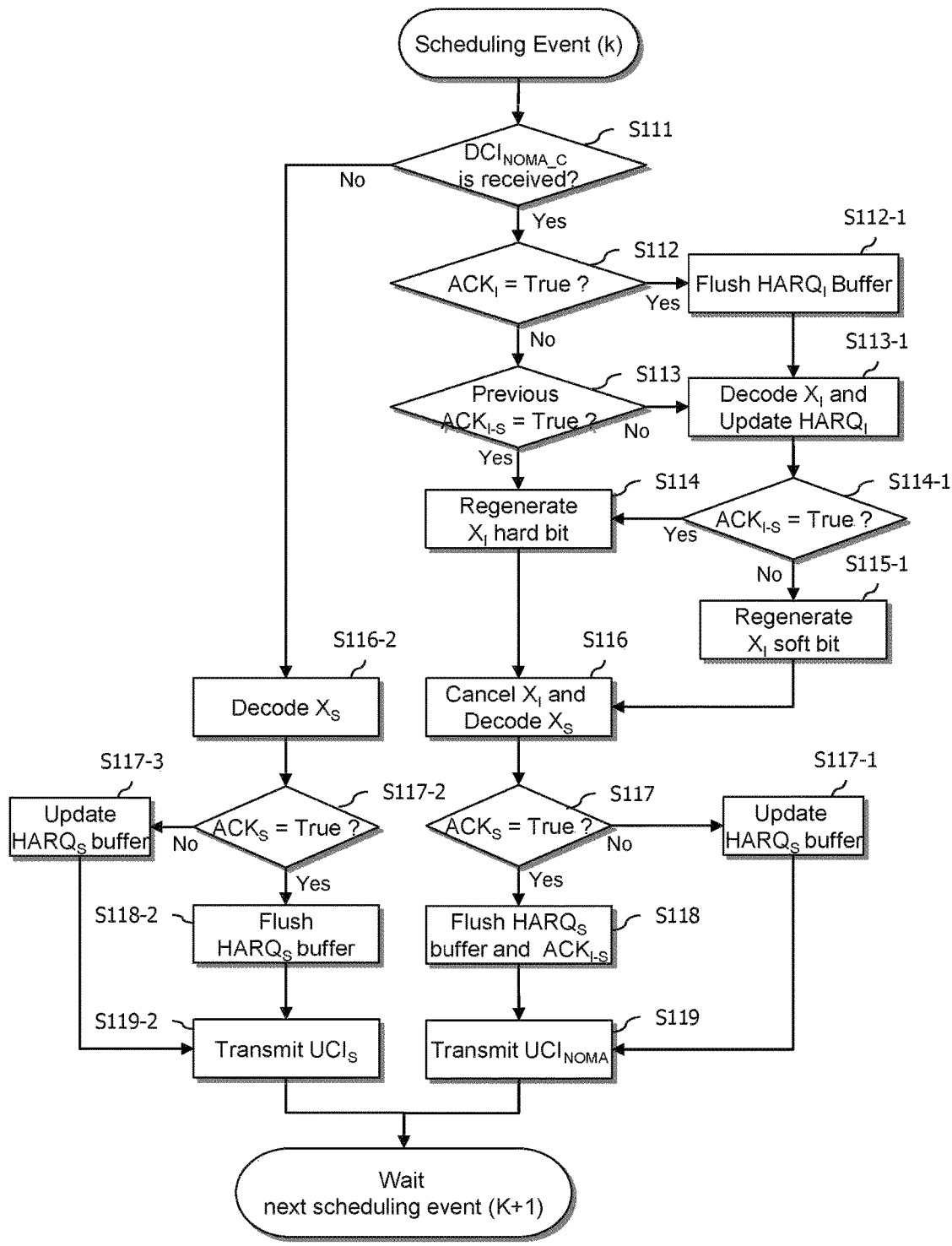
FIG. 12 is a flowchart illustrating a detailed operation of an interference cancellation receiving technique using a CWIC technique in a NOMA scheme.

FIG. 12 is a Flowchart Illustrating a Detailed Operation of an Interference Cancellation Receiving Technique Using a CWIC Technique in a NOMA Scheme.

First, the $UE_S$ uses a CWIC interference cancellation receiving technique, and when the $UE_S$ receives data $X_S$, it is assumed that the $UE_S$ transmits HARQ ACK/NACK. Further, it is assumed that the $UE_S$ stores a soft channel bit through a HARQ operation for an interference signal, and it is assumed that a soft channel bit of a stored interference signal $X_S$ is used for $X_I$ to be transmitted at a next subframe.

Referring to FIG. 12, the $UE_S$ determines whether $DCI_{NOMA}$ is received (S111). If $DCI_{NOMA}$ is not received, the $UE_S$ performs a common data receiving procedure (S116-2, S117-2, S117-3, S118-2, and S119-2).

Thereafter, if $DCI_{NOMA}$ is received at the process S111, the $UE_S$ determines information about $ACK/NACK_I$ (k−1) on whether the $UE_I$ causing the interference has succeeded in decoding interference data $X_U$ within the $DCI_{NOMA}$ (S112). If the $UE_I$ causing the interference has succeeded in decoding interference data $X_I$ (i.e., when $ACK_I$=True), the interference data $X_I$ received at a current subframe are new data and thus the $UE_S$ flushes (i.e., initiates) an $HARQ_I$ buffer (S112-1).

(A) The $UE_S$ completely cancels the interference data $X_I$ and decodes data $X_S$ thereof (S116). Thereafter, the $UE_S$ determines whether a decoding result of the data $X_S$ is success (S117). If a decoding result of the data $X_S$ is success (i.e., when $ACK_S$=True), the $UE_S$ performs a process S118 and transmits $UCI_{NOMA}$ ($ACK_S$, $ACK_{I\text{-}S}$) (S119).

(B) The $UE_S$ decodes the interference data $X_I$ (S113-1), but if a decoding result of the data $X_S$ is failure (S114-1), the $UE_S$ regenerates a soft bit of the interference data $X_I$ through turbo decoding (S115-1). The $UE_S$ partially cancels the interference data $X_I$ using the soft bit and decodes the data $X_S$ (S116). The $UE_S$ determines whether a decoding result of the data $X_S$ is success (S117). If a decoding result of the data $X_S$ is success (i.e., when $ACK_S$=True), the $UE_S$ performs a process S118 and transmits $UCI_{NOMA}$ ($ACK_S$, $NACK_{I-S}$) (S119).

(C) The $UE_S$ succeeds cancellation of the interference data $X_I$, but if decoding of the data $X_S$ is failure (S117), the $UE_S$ performs a process S117-1 and transmits $UCI_{NOMA}$ ($NACK_S$, $ACK_{I-S}$) (S119).

(D) If decoding of the interference data $X_I$ is failure (S114-1), the $UE_S$ regenerates a soft bit of the interference data $X_I$ through turbo decoding (S115-1), cancels the interference data $X_I$ through the regenerated soft bit, decodes the data $X_S$ (S116), but if decoding of the data $X_S$ is failure (S117), the $UE_S$ performs a process S117-1 and transmits $UCI_{NOMA}$ ($NACK_S$, $NACK_{I-S}$) (S119).

At the (A) to (D), a detailed operation of the $UE_S$ is as follows.

In a case (A), the $UE_S$ stores currently received interference data $X_I$ at $HARQ_I$ for a future CWIC operation (S113-1). Further, the $UE_S$ flushes a $HARQ_S$ buffer, initiates $ACK_{I-S}$ (S118), and transmits $UCI_{NOMA}$ ($ACK_S$, $ACK_{I-S}$) (S119).

In a case (B), the $UE_S$ stores currently received interference data $X_I$ at the $HARQ_I$ for a future CWIC operation (S113-1). Further, the $UE_S$ transmits $UCI_{NOMA}$ ($ACK_S$, $NACK_{I-S}$) (S119).

In a case (C), the $UE_S$ stores currently received interference data $X_I$ at the $HARQ_I$ for a future CWIC operation (S113-1). The $UE_S$ stores $X_S$ at the $HARQ_S$ buffer (S117-1). In this case, although decoding of $X_S$ is failed, the interference data $X_I$ are completely cancelled, and thus $X_S$ becomes a signal having a relatively good quality and is thus stored with a high weight value c within the $HARQ_S$ buffer.

In a case (D), the $UE_S$ stores currently received interference data $X_I$ at the $HARQ_I$ for a CWIC operation (S113-1). The $UE_S$ stores $X_S$ at the $HARQ_S$ buffer (S117-1). In this case, when decoding of the interference data $X_I$ is failed, interference is partially cancelled by using regeneration of a soft bit instead of regeneration of a hard bit and thus it may be regarded that some interference data $X_I$ are still remained at the $X_S$. Accordingly, the $X_S$ is stored with a low weight value $\alpha_L$ within the $HARQ_S$ buffer.

Alternatively, in each case of the (A) to (D), operation at a next subframe of the BS is divided into two according to an ACK/NACK result reported from the $UE_I$ causing the interference. When the $UE_I$ causing the interference reports ACK, the BS maintains an existing state and performs NOMA scheduling. However, when the $UE_I$ causing the interference reports NACK, the BS operates as follows.

In a case (A), the BS transmits new data to the $UE_S$ and retransmits existing data to the $UE_I$ causing the interference. Because data retransmitted to the $UE_I$ causing the interference are already completely stored within the $HARQ_I$ buffer of the $UE_S$, the $X_I$ does not operate as new interference to the $UE_S$. Accordingly, by applying high SNR offset $\Delta_{SNR-H}$ in a scheduling process for the $UE_S$, the BS may schedule much data.

In a case (B), the BS transmits new data to the $UE_S$ and retransmits existing data to the $UE_I$ causing the interference. Because data retransmitted for $UE_I$ causing the interference are previously partially stored at the $HARQ_I$ of the $UE_S$, interference in which the $X_I$ applies to the $UE_S$ is somewhat reduced. Accordingly, by applying a little SNR offset $\Delta_{SNR-L}$ in a scheduling process of the $UE_S$, the BS may schedule much data.

In a case (C), the BS retransmits existing data to each of the $UE_S$ and the $UE_I$. Because data retransmitted to the $UE_I$ are already completely stored within the $HARQ_I$ buffer of the $UE_S$, $X_I$ does not operate as new interference to the $UE_S$. Therefore, the BS may increase determined transmission power by $\Delta_{PWR-H}$ than reference power for the $UE_I$ to obtain a performance gain of the $UE_I$ or may allocate transmission power to reference power and obtain a performance gain of the $UE_S$.

In a case (D), the BS retransmits existing data to each of the $UE_S$ and the $UE_I$. Because data retransmitted to the $UE_I$ are previously partially stored within the $HARQ_I$ buffer of the $UE_S$, interference in which $X_I$ applies to the $UE_S$ is somewhat reduced. Therefore, the BS may increase determined transmission power by $\Delta_{PWR-L}$ than reference power for the $UE_I$ to obtain a performance gain of the $UE_I$ or may allocate transmission power to reference power and obtain a performance gain of the $UE_S$.

The foregoing each variable is as follows.

$\alpha_H/\alpha_L$: $HARQ_S$ soft buffer weight coefficient

For example, $HARQ_S$ (n+1)=$HARQ_S$ (n)+$\alpha X_S$ $\Delta_{SNR}$: SNR offset for next MCS scheduling in the BS $\Delta_{PWR}$: power allocation factor between $UE_S$ and $UE_I$ in the BS A HARQ buffer that stores a soft channel bit of the interference data $X_I$ may be implemented using an additional memory space, or may be implemented by partitioning an existing HARQ buffer. When following the partitioning, the existing HARQ buffer is partitioned into a buffer for receiving data $X_S$ and a buffer for the interference data $X_I$. In this way, when using a temporary buffer by a partitioning technique, a cost may be reduced due to somewhat deterioration of a decoding performance.

As described above, when using a symbol level interference cancellation receiving technique in a NOMA scheme, operation of the $UE_S$ is the same as that when using an existing common symbol level interference cancellation technique. However, the $UE_S$ is enhanced to report UCI including a $G_{Symbol-IC}$ value representing a gain of the interference cancellation receiver to the BS. In order to guarantee a QoS of a data channel, the BS generally performs Inner-loop Link Adaptation based on ACK/NACK reported from a corresponding UE and separately performs Outer-Loop Link Adaptation in consideration of a previous BLER result. In an interference cancellation receiving technique, an interference cancellation gain is changed according to the interference data $X_I$, and different interference cancellation gains are obtained on an UE basis according to the applied interference cancellation technique. Therefore, when the corresponding UE reports an interference cancellation gain $G_{Symbol-IC}$ value to the BS, the BS calculates an interference cancellation receiving gain according to a form of an additionally together transmitted interference signal to BLER through previous BLER to perform more precise Outer-Loop Link Adaptation and thus improvement of an entire gain of a system can be obtained.

$G_{Symbol-IC}$ representing an interference cancellation receiving gain calculated in the interference cancellation receiver may be obtained with various methods, and for example, the following case may exist. A level of quality enhancement of an intended signal or a level of interference cancelled with an IC may be quantized and fed back.

ACK, NACK with low, medium, high residual interference $G_{Symbol\text{-}IC} = \text{var}(X_{pre\text{-}IC}) - \text{var}(X_{post\text{-}IC})$ $G_{Symbol\text{-}IC} = \text{var}(LLR) - \text{var}(LLR_{MMSE})$ $G_{Symbol\text{-}IC} = $ ACK/NACK with low,medium,high residual interference As described above, exemplary embodiments of the present invention may be implemented through various means. For example, exemplary embodiments of the present invention may be implemented by hardware, firmware, software, or a combination thereof. Specifically, exemplary embodiments of the present invention will be described with reference to the drawings.

Figure 13:
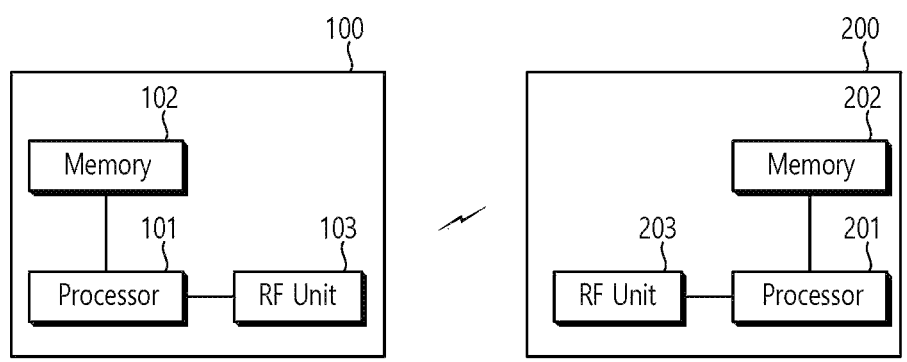
FIG. 13 is a block diagram illustrating a wireless communication system according to disclosure of this specification.

FIG. 13 is a Block Diagram Illustrating a Wireless Communication System According to Disclosure of this Specification.

A BS 200 includes a processor 201, a memory 202, and a radio frequency (RF) unit 203. The memory 202 is connected to the processor 201 to store various information for driving the processor 201. The RF unit 203 is connected to the processor 201 to transmit and/or receive a wireless signal. The processor 201 implements a suggested function, process, and/or method. In the foregoing exemplary embodiment, operation of the BS may be implemented by the processor 201.

An UE 100 includes a processor 101, a memory 102, and an RF unit 103. The memory 102 is connected to the processor 101 to store various information for driving the processor 101. The RF unit 103 is connected to the processor 101 to transmit and/or receive a wireless signal. The processor 101 implements a suggested function, process, and/or method.

The processor may include an application-specific integrated circuit (ASIC), another chipset, a logic circuit and/or a data processor. The memory may include a read-only memory (ROM), a random access memory (RAM), a flash memory, a memory card, a storage medium, and/or another storage device. The RF unit may include a baseband circuit for processing a wireless signal. When an exemplary embodiment is implemented with software, the above-described technique may be implemented with a module (process, function) that performs the above-described function. The module may be stored at a memory and may be executed by the processor. The memory may exist at the inside or the outside of the processor and may be connected to the processor with well-known various means.

In the above illustrated systems, although the methods have been described on the basis of the flowcharts using a series of steps or blocks, the present invention is not limited to the sequence of the steps, and some of the steps may be performed with different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method of receiving data using a Non-Orthogonal Multiple Access (NOMA) scheme, the method performed by a user equipment (UE) and comprising:
    receiving, by the UE, downlink control information (DCI) for a NOMA scheme and downlink data including interference data based on the DCI,
    wherein the DCI includes a hybrid automatic repeat request (HARQ) ACK or HARQ NACK,
    wherein the HARQ ACK included in the DCI indicates that another UE, which has been allocated with the same frequency-time resource to the UE, has previously performed successful reception of the interference data, and
    wherein the HARQ NACK included in the DCI indicates that the another UE has not previously performed successful reception of the interference data;
    decoding, by the UE, the interference data based on (i) that the DCI includes the HARQ ACK, or based on (ii) that the DCI includes the HARQ NACK and the UE has not previously performed successful reception of the interference data;
    cancelling, by the UE, the interference data from the received downlink data based on a result of the decoding of the interference data; and
    decoding, by the UE, the remaining downlink data after the interference data have been cancelled.

2. The method of claim 1, further comprising:
    transmitting, by the UE, uplink control information (UCI) including HARQ ACK/NACK of the UE for the interference data and HARQ ACK/NACK of the UE for the downlink data.

3. The method of claim 1, wherein the DCI includes downlink resource allocation information for receiving the downlink data.

4. The method of claim 1, further comprising:
    flushing a HARQ buffer for interference data when the DCI includes the HARQ ACK; and
    storing the decoded interference data within the HARQ buffer for the interference data.

5. The method of claim 1, further comprising:
    when the DCI includes the HARQ NACK and the UE has previously performed successful reception of the interference data, cancelling, by the UE, the interference data from the received downlink data based on a result of the previously performed successful reception.

6. The method of claim 5, further comprising:
    generating a hard bit of the interference data using the previously successfully received interference data by the UE, when the DCI includes the HARQ NACK and the UE has previously performed successful reception of the interference data; and
    cancelling the interference data based on the generated hard bit.

7. A user equipment (UE) that performs data reception of a Non-Orthogonal Multiple Access (NOMA) scheme, the UE comprising:
    a transceiver; and
    a processor operatively connected to the transceiver and configured to:
        control the transceiver to receive downlink control information (DCI) for a NOMA scheme and downlink data including interference data based on the DCI,
        wherein the DCI includes a hybrid automatic repeat request (HARQ) ACK or HARQ NACK,
        wherein the HARQ ACK included in the DCI indicates that another UE, which has been allocated with the same frequency-time resource to the UE, has previously performed successful reception of the interference data, and
        wherein the HARQ NACK included in the DCI indicates that the another UE has not previously performed successful reception of the interference data;

decode the interference data based on (i) that the DCI includes the HARQ ACK, or based on (ii) that the DCI includes the HARQ NACK and the UE has not previously performed successful reception of the interference data;

cancel the interference data from the received downlink data based on a result of the decoding of the interference data; and decode the remaining downlink data after the interference data have been cancelled.

8. The UE of claim 7, wherein the processor is further configured to control the transceiver to transmit uplink control information (UCI) including HARQ ACK/NACK of the UE for the interference data and HARQ ACK/NACK of the UE for the downlink data.

9. The UE of claim 7, wherein the DCI includes downlink resource allocation information for receiving the downlink data.

10. The UE of claim 7, wherein the processor is further configured to:

flush a HARQ buffer for interference data when the DCI includes the HARQ ACK; and store the decoded interference data within the HARQ buffer for the interference data.

11. The UE of claim 7, wherein the processor is further configured to:

when the DCI includes the HARQ NACK and the UE has previously performed successful reception of the interference data, cancel the interference data from the received downlink data based on a result of the previously performed successful reception.

12. The UE of claim 11, wherein the processor is further configured to:

generate a hard bit of the interference data using the previously successfully received interference data by the UE, when the DCI includes the HARQ NACK and the UE has previously performed successful reception of the interference data; and cancel the interference data based on the generated hard bit.

13. The method of claim 1, further comprising:

generating a hard bit of the interference data using the interference data when the decoding of the interference data has successfully performed; and cancelling the interference data based on the generated hard bit.

14. The method of claim 1, further comprising:

generating a soft bit of the interference data using the interference data when the decoding of the interference data has not been successfully performed; and cancelling the interference data based on the generated soft bit.

15. The UE of claim 7, wherein the processor is further configured to:

generate a hard bit of the interference data using the interference data when the decoding of the interference data has been successfully performed; and cancel the interference data based on the generated hard bit.

16. The UE of claim 7, wherein the processor is further configured to:

generate a soft bit of the interference data using the interference data when the decoding of the interference data has not been successfully performed; and cancel the interference data based on the generated soft bit.

* * * * *